US 6,622,983 B2

(12) United States Patent
Hall

(10) Patent No.: US 6,622,983 B2
(45) Date of Patent: Sep. 23, 2003

(54) PARTICLE CONTROL VALVE

(76) Inventor: Lawrence Hall, 43 E. Slade St., Palatine, IL (US) 60067

(*) Notice: Subject to any disclaimer, the term of this patent is extended or adjusted under 35 U.S.C. 154(b) by 108 days.

(21) Appl. No.: 09/939,273

(22) Filed: Aug. 24, 2001

(65) Prior Publication Data
US 2002/0024034 A1 Feb. 28, 2002

Related U.S. Application Data
(60) Provisional application No. 60/227,969, filed on Aug. 25, 2000.

(51) Int. Cl.[7] ...................... F16K 31/383; F16K 31/122
(52) U.S. Cl. .......................................... 251/62; 251/214
(58) Field of Search .................. 251/62–63.6, 213–280, 251/335.1, 335.3

(56) References Cited

U.S. PATENT DOCUMENTS

| 1,317,363 A | 9/1919 | Gasche |
| 1,905,698 A | 4/1933 | Fulton |
| 1,988,432 A | 1/1935 | Gillett et al. |
| 2,107,084 A | 2/1938 | Pletcher |
| 2,200,587 A | 5/1940 | Tirrell |
| 2,376,287 A | 5/1945 | Sorrentino |
| 2,608,801 A | 9/1952 | Ridley |
| 2,658,312 A | 11/1953 | Smith |
| 2,694,545 A | 11/1954 | Steenbergh |
| 3,102,368 A | 9/1963 | Smith |
| 4,117,859 A | 10/1978 | Illy |
| 4,137,933 A | 2/1979 | Culpepper |
| 4,802,313 A | 2/1989 | Smith |
| 4,973,026 A | 11/1990 | Saurwein |
| 5,074,526 A | * 12/1991 | Ragsdale et al. ........... 251/267 |
| 5,199,229 A | 4/1993 | Herold et al. |
| 5,238,022 A | * 8/1993 | Zink ........................... 251/62 |
| 5,992,947 A | * 11/1999 | Tsubouchi ............... 303/114.3 |
| 6,116,267 A | * 9/2000 | Suzuki et al. ............. 251/335.1 |

* cited by examiner

Primary Examiner—Paul J. Hirsch
(74) Attorney, Agent, or Firm—Piper Rudnick

(57) ABSTRACT

A valve for controlling a flow of pressurized abrasive particles to a machine includes a valve body that defines a particle chamber having an inlet port and an exit orifice. A tapered valve seat surrounds the exit orifice. A shaft having a nose piece is positioned within the particle chamber. The shaft is movable between a closed position, where the nose piece engages the valve seat so that particles cannot pass through the exit orifice, and an open position, where particles are free to flow out of the exit orifice. A flexible barrier surrounds the shaft and separates the particle chamber from the actuating mechanism to prevent abrasive particles from damaging the actuating mechanism. A clean chamber is positioned between the shaft actuating mechanism and the barrier and is pressurized to a pressure generally equal to that of the particle chamber to prevent damage to the barrier.

20 Claims, 2 Drawing Sheets

PARTICLE CONTROL VALVE

This application claims priority from U.S. Provisional patent application Ser. No. 60/227,969, filed Aug. 25, 2000.

BACKGROUND OF THE INVENTION

The present invention relates generally to valves and, more particularly, to a valve for controlling the pressurized flow of particles for an abrasive blasting machine or an agricultural, medical, pharmaceutical or other device.

Blasting machines, such as a sandblasting machine, use abrasive particles, such as powdered glass, sand or metal, to clean or prepare surfaces or objects for further treatment or use. For example, blasting machines are used as wire strippers to remove ceramic insulation from industrial-grade electrical wires so that the wires may be soldered or otherwise connected to electrical equipment.

A blasting machine typically features a nozzle arrangement that is directed at the surface or object to be cleaned or prepared. Abrasive particles are delivered to the nozzle arrangement of the blasting machine from a pressurized source through plastic or rubber tubing or hoses. The flow of abrasive particles to the blasting machine is conventionally controlled by a "pinch" type valve. More specifically, the pinch valve is used to squeeze the hose so that the flow of abrasive particles is closed off. To restore the flow of abrasive particles to the blasting machine nozzle, the pinch valve is manipulated so that the hose is released. Alternative pinch valve arrangements perform the same function by squeezing a rubber sleeve which is fitted in series with the abrasive hose.

Pinch valves are also used in applications other than abrasive blasting (e.g. agricultural, medical, pharmaceutical, etc.), and the present invention relates to those areas also.

A disadvantage of pinch valve arrangements, however, is that frequent replacement of the sleeve or hose is required. Typically, such replacements need to be carried out after a few thousand operations. If the sleeves or hoses are not replaced, they will fracture and allow pressurized particles to escape into the workplace. This can be a safety hazard.

As an alternative to pinch valves, "needle" abrasive control valves exist for blasting machines. Such a valve arrangement is illustrated in U.S. Pat. No. 4,802,313, to Smith. The Smith '313 patent discloses an abrasive control valve featuring an air-actuated piston arrangement. A shaft is connected to the piston at one end while its opposite end features a tip. The valve features a housing that is divided into three chambers: an air chamber, a mixing chamber and the chamber that serves as the cylinder for the sliding piston. The air chamber receives pressurized air and the mixing chamber receives abrasive. The air and mixing chambers are in communication and the latter features an outlet through which a resulting pressurized flow of abrasive may exit the valve. The tip of the shaft is sized to engage the outlet so that the valve may be closed by introducing air into the cylinder on one side of the piston and opened by introducing air into the cylinder on the opposite side of the piston.

The cylinder chamber of the housing in the Smith '313 patent is divided from the air and mixing chambers by a wall with a cylindrical passage through which the shaft passes. The shaft is provided with a circumferential groove within which an O-ring is secured. The O-ring engages the interior wall of the cylindrical passage in a sliding fashion to prevent abrasive from the air and mixing chambers entering the cylinder chamber. A disadvantage of such an arrangement, however, is that the O-ring wears due to its sliding engagement with the cylindrical passage. As a result, the O-ring requires frequent replacement.

A further disadvantage of the Smith '313 patent is that the walls of the mixing chamber disclosed therein do not taper towards the outlet through which the pressurized flow of abrasive passes. This decreases the flow rate of abrasive particles out of the mixing chamber and also increases the wear on the mixing chamber walls.

U.S. Pat. Nos. 2,658,312 and 3,102,368, both to Smith, illustrate spray guns that use a needle valve arrangement to control to delivery of abrasive to a surface or object. Both patents use an air-actuated piston to open or close the needle valve. Both patents also separate the piston cylinder from the abrasive chamber with a wall having a passage through which a shaft passes. The shaft has a tip that engages the valve outlet. In each patent, the passage contains a packing gland assembly to prevent the escape of abrasive from the abrasive chamber into the cylinder. The shaft slides against the packing glands. As a result, the packing glands also suffer wear and require frequent replacement.

An additional disadvantage of the Smith '312 and '368 patents is that abrasive entering the valves disclosed therein impacts their needle valve shafts. This may cause points of increased wear to form on the shafts. Furthermore, the valves of the Smith '312 and '368 patents feature abrasive chambers that are only slightly larger than their needle valve shafts. This reduces the dispersal of the abrasive particles in the abrasive chambers so that abrasive flow out of the valves is adversely impacted. The reduced dispersal of the abrasive particles also causes increased wear of the shaft and chamber walls.

Accordingly, it is an object of the present invention to provide a particle control valve that does not pinch the hose supplying particles to a machine.

It is another object of the present invention to provide a particle control valve that is capable of performing a large number of operations without maintenance.

It is another object of the present invention to provide a particle control valve that does not permit the escape of particles into the workplace if failure of the valve occurs.

It is another object of the present invention to provide a particle control valve that may serve as a general replacement for pinch type valves in a variety of machines and applications.

It is still another object of the present invention to provide a particle control valve that optimizes the flow of particles therethrough.

It is still another object of the present invention to provide a particle control valve that undergoes less wear of its interior chamber walls, outlet and needle valve shaft when in operation.

SUMMARY OF THE INVENTION

The present invention is directed to a particle control valve for controlling the flow of a pressurized powder or particles, such as abrasive media, to a machine or device, such as a blasting machine. Abrasive powder carried in a stream of compressed air is supplied through an angled passage to a valve body that contains a particle/abrasive chamber. A shaft positioned within the abrasive chamber is moved between open and closed positions by an actuating mechanism such as an air piston and cylinder arrangement. On the end of the shaft is a rubber nose piece which seals against a hardened seat when the shaft is in the closed position. When the shaft is in the open position, the nose piece disengages the seat to permit passage of abrasive out of the valve.

A flexible sealed barrier is situated between the valve body and the housing of the piston and cylinder to prevent abrasive from contaminating the piston and cylinder thus creating a "clean" and "dirty" side of the valve. A clean chamber positioned between the piston and cylinder mechanism and the barrier is pressurized with air at generally the same pressure as the abrasive chamber so that the barrier always has generally equal pressure on either side thus minimizing wear of the barrier.

The junction between the angled passage and the abrasive chamber has a larger cross-sectional area than that of the angled passage. The angled passage has a larger cross-sectional area than the input port through which abrasive is delivered to the valve. The velocity of the abrasive particles thus decreases upon entry into the angled passage, and then again upon entry into the abrasive chamber. This eliminates a potential wear point on the shaft and reduces wear on the passage and abrasive chamber walls. In addition, this causes the particles to disperse around the shaft before passing through the valve exit orifice. The dispersal of abrasive around the shaft eliminates a possible concentration of abrasive on one side of the exit orifice. This enables an optimal flow of abrasive out of the valve. The diameter of the abrasive chamber is significantly larger than that of the shaft which also encourages even dispersal of the abrasive around the shaft.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
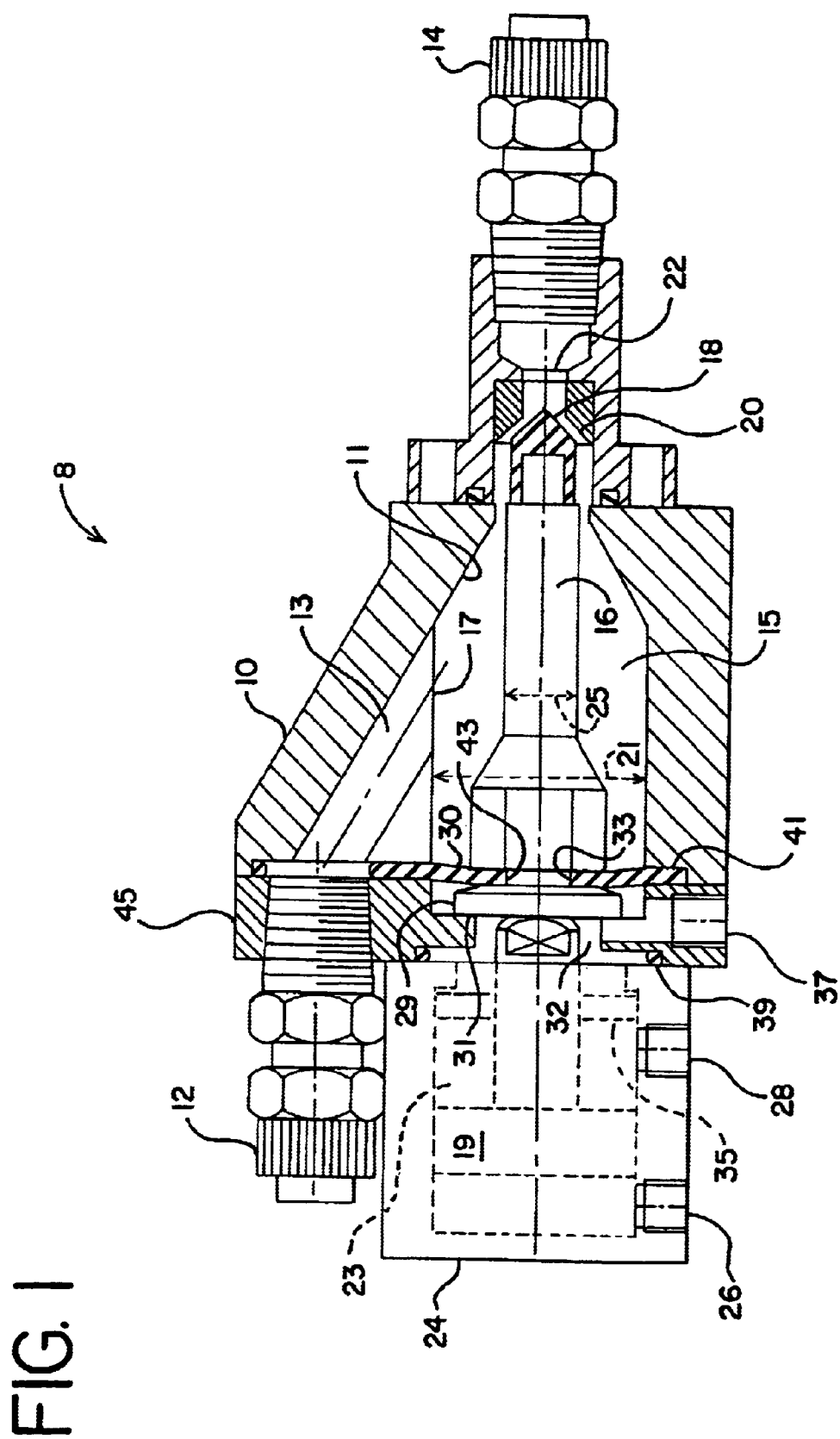
FIG. 1 is a sectional side elevation view of an embodiment of the particle control valve of the present invention.

An embodiment of the particle control valve of the present invention is indicated in general at 8 in FIG. 1. It is to be understood that while the invention is described in terms of an abrasive control valve, other applications, such as in agricultural, medical and pharmaceutical systems or devices, are contemplated. The valve features a body 10 having a pressurized abrasive inlet port 12 and outlet 14. A hose (not shown) carrying a pressurized flow or stream of abrasive particles is connected to inlet port 12. Pressurized abrasive travels through inlet port 12, through angled passage 13 and into a particle chamber or abrasive chamber 15.

Angled passage 13 has a larger cross-sectional area than the hose supplying abrasive. The junction 17 between the passage 13 and the abrasive chamber 15 features a cross-sectional area that is larger than the cross-sectional area of passage 13. As a result, the velocity of the abrasive particles decreases as they enter passage 13, and then again as they enter abrasive chamber 15. This reduces wear upon the walls of passage 13 and ensures that the abrasive particles are dispersed throughout chamber 15. This eliminates a potential wear point on shaft 16 and reduces wear on the walls of the abrasive chamber. In addition, the dispersal of the abrasive particles around the shaft eliminates a possible concentration on one side of the chamber 15 so that the flow of abrasive through outlet 14 is optimized.

The chamber preferably features tapered walls 11 so that the diameter 21 of chamber 15 decreases in the vicinity of the chamber exit orifice 22. As a result, the flow of abrasive particles in the chamber to outlet 14 is optimized while the wear on the chamber walls is minimized.

A shaft 16 is positioned within the valve body and slides between an open position (illustrated in FIG. 1) and a closed position. When the shaft 16 is in the open position, pressurized abrasive may pass through exit orifice 22 and out of outlet 14 to a use device such as a blasting machine nozzle (not shown). The shaft 16 is equipped with a nose piece 18 constructed of rubber or similar material which seals against a hardened seat 20 so that exit orifice 22 is closed when the shaft is in the closed position. The seat 20 is tapered towards the exit orifice to optimize the flow of abrasive particles into the exit orifice and minimize wear on the seat while still providing an effective seal when in the closed position.

The diameter 25 of shaft 16 is sized significantly smaller than the diameter of 21 of the abrasive chamber 15. This allows the abrasive particles entering the chamber to be more evenly dispersed around shaft 16 so as to eliminate potential wear spots on the shaft and to optimize the flow of the abrasive particles through the exit 14. Preferably, the diameter of the abrasive chamber 15 is at least three times the diameter of the shaft 16.

The end of shaft 16 opposite of nose piece 18 is attached to an actuating mechanism such as a piston 19 slidably positioned within a cylinder 23 contained within housing 24. A cap 35 surrounds shaft 16 and defines one end of cylinder 23. Piston housing 24 features bores 26 and 28 that are in communication with cylinder 23 on opposite sides of the piston 19. As a result, the configuring of the shaft 16 between the open and closed positions may be controlled through the introduction of air into either bore 26 or 28. More specifically, air is directed into bore 28 to open the valve, while air is directed into bore 26 to close the valve. A collar 29 is positioned around the shaft 16 and serves to limit travel of the shaft as the valve is opened via engagement of annular shoulder 31. It should be noted that while a piston and cylinder arrangement is illustrated, alternative actuating mechanisms for moving the shaft between the closed and open positions may be utilized. Such mechanisms can include, but are not limited to, electric motors and hydraulic, mechanical or pneumatic linkages that are known in the art.

A circumferential groove 33 is formed in shaft 16 adjacent to collar 29. A flexible barrier 30 constructed of rubber or other flexible material is secured at its outer periphery 41 between the valve body 10 and a barrier housing 45. The flexible barrier includes a central opening 43 sized to engage the circumferential groove 33 so that a seal is formed about shaft 16. As a result, flexible barrier 30 flexes to accommodate movement of the shaft 16 between the open and closed positions.

The flexible barrier 30 separates the abrasive chamber 15 from the "clean" chamber 32 of the barrier housing 45. The piston and cylinder within the piston housing 24 are separated from the clean chamber 32 by cap 35. As a result, the sliding seal between the shaft 16 and the cap 36 is not subjected to the destructive abrasive particles. The clean chamber 32 is pressurized with air through an aperture 37 formed in barrier housing 45 to a pressure generally equal to the pressure within abrasive chamber 15 to minimize wear of the barrier 30. In addition to minimizing wear of the barrier 30, the pressure in the clean chamber prevents the failure of the barrier due to over distortion by pressure in the abrasive chamber. An O-ring 39 is secured between piston housing 24 and barrier housing 45 to assist in sealing the clean chamber.

Figure 2:
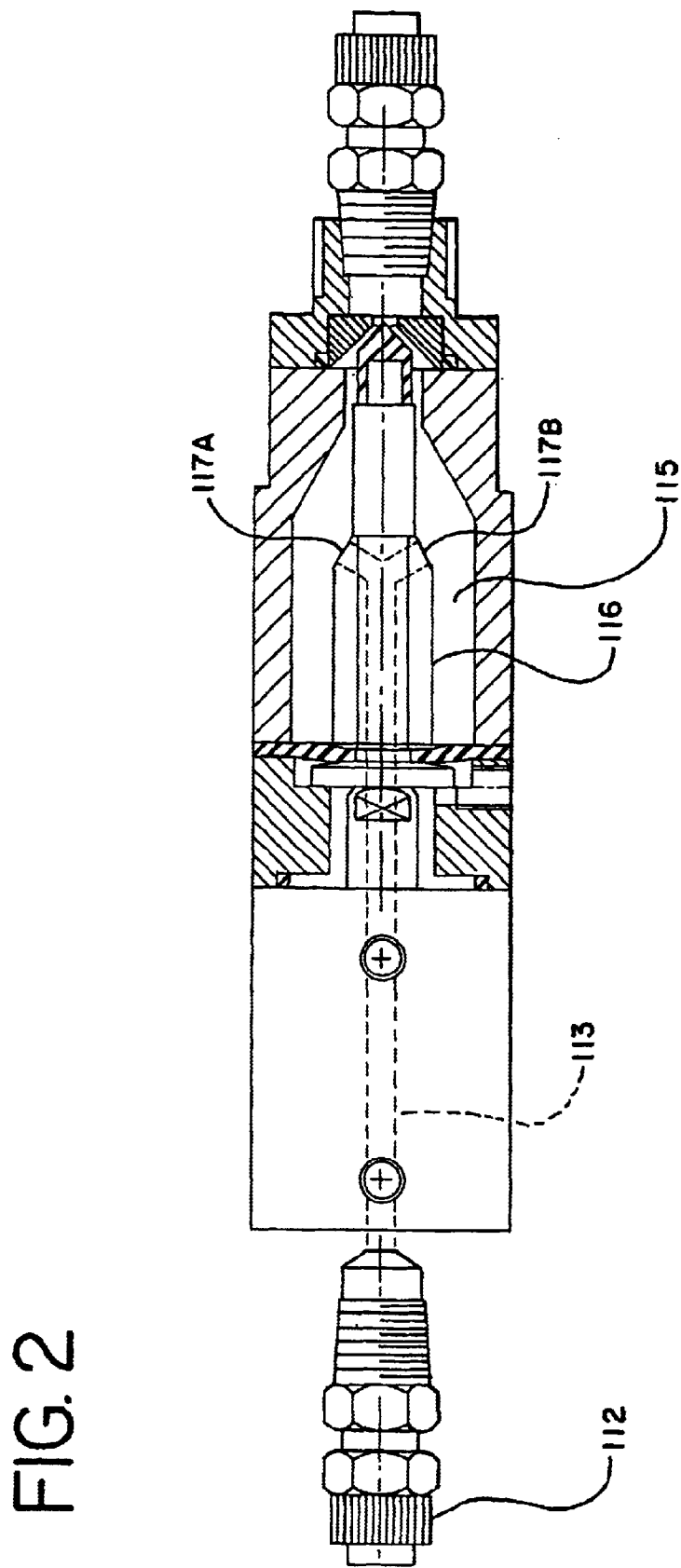
FIG. 2 is a sectional side elevation view of an alternative embodiment of the particle control valve of the present invention.

An alternative embodiment of the particle control valve of the present invention is illustrated in FIG. 2. In this version, the abrasive passage 113 is positioned through the piston (not shown) and shaft 116. Abrasive exits the passage 113 through openings 117A and 117B and passes into the particle or abrasive chamber 115. The inlet port 112 may be connected to the piston so that the two move together. With the exception of the positioning of passage 113, the valve of FIG. 2 operates in the same fashion as the valve of FIG. 1. This embodiment provides a stacked arrangement that may be more suitable for some applications.

The abrasive control valve of the present invention is extremely reliable and does not require frequent maintenance. Typically the device can operate well in excess of 250,000 cycles before parts require replacement. Eventually if the valve does fail, no abrasive can escape into the workplace as the operating mechanism is wholly contained within the main body. This eliminates potential safety hazards.

While the preferred embodiments of the invention have been shown and described, it will be apparent to those skilled in the art that changes and modifications may be made therein without departing from the spirit of the invention, the scope of which is defined by the appended claims.

What is claimed is:

1. A valve for controlling a flow of particles from a pressurized source to a machine comprising:
    a) a valve body defining a particle chamber and featuring an inlet port and an exit orifice in communication with the particle chamber, said inlet port in communication with the pressurized source of particles and said exit orifice in communication with the machine;
    b) a seat positioned around said exit orifice;
    c) a shaft featuring a nose piece and positioned within said particle chamber, said shaft movable between a closed position where said nose piece engages said seat so that said exit orifice is closed to prevent the flow of particles to the machine and an open position where said nose piece is removed from said seat to permit the flow of particles to the machine;
    d) an actuating mechanism attached to the shaft for moving the shaft between the closed and open positions; and
    e) a flexible barrier surrounding and engaging said shaft and separating said particle chamber from said actuating mechanism.

2. The valve of claim 1 further comprising a clean chamber positioned between said barrier and said actuating mechanism, said clean chamber in communication with a source of pressurized air so that a pressure in the clean chamber is generally equal to a pressure in the particle chamber.

3. The valve of claim 1 further comprising a passage in communication between the inlet port and said particle chamber, said passage having a cross-sectional area greater than that of the inlet port so as to reduce velocity of particles as they travel through the inlet port and into the passage.

4. The valve of claim 3 wherein said inlet port, said passage and said particle chamber have progressively larger cross-sectional areas and all have cross-sectional areas that are larger than a cross-sectional area of said shaft so that particles entering the particle chamber are dispersed around said shaft.

5. The valve of claim 1 further comprising a passage in communication between the inlet port and said particle chamber, said passage communicating with the particle chamber through a junction with said junction having a cross-sectional area that is larger than a cross-sectional area of the passage so as to reduce velocity of particles as they enter the particle chamber.

6. The valve of claim 1 wherein said particle chamber features a diameter that is at least three times the diameter of the shaft so that particles entering the particle chamber are dispersed around said shaft.

7. The valve of claim 1 where in said particle chamber has a diameter that tapers towards said exit orifice.

8. The valve of claim 1 wherein said seat is tapered towards said exit orifice.

9. The valve of claim 1 wherein said actuating mechanism includes a piston housing defining a cylinder and a piston attached to the shaft, said piston slidingly positioned within the cylinder and said piston housing featuring a first bore in communication with the cylinder on one side of the piston and a second bore in communication with the cylinder on an opposite side of the cylinder so that said shaft may be moved into the closed position by introducing air into the cylinder through the first bore and into the open position by introducing air into the cylinder through the second bore.

10. The valve of claim 9 wherein a barrier housing is positioned between the valve body and the piston housing and said flexible barrier is secured between the valve body and the barrier housing, said barrier housing defining a clean chamber and said clean chamber in communication with a source of pressurized air so that a pressure in the clean chamber is generally equal to a pressure in the particle chamber.

11. The valve of claim 1 wherein said shaft includes a circumferential groove which is engaged by said flexible barrier.

12. An abrasive control valve comprising:
   a) a valve body defining an abrasive chamber having an abrasive inlet port and an abrasive exit port;
   b) a shaft having a nose piece positioned within said abrasive chamber and movable between a closed position where the nose piece closes the exit orifice of the abrasive chamber and an open position where the nose piece is removed from the exit orifice;
   c) a means for moving the shaft between the open and closed positions; and
   d) a flexible barrier surrounding and engaging said shaft and separating said abrasive chamber from said means for moving the shaft.

13. The valve of claim 12 further comprising a barrier housing positioned between said valve body and said means for moving the shaft, said barrier housing defining a clean chamber that is in communication with a source of pressurized air so that a pressure in the clean chamber is generally equal to a pressure in the abrasive chamber.

14. The valve of claim 12 further comprising a passage in communication between the inlet port and said abrasive chamber, said passage having a cross-sectional area greater than that of the inlet port so as to reduce velocity of abrasive as it travels through the inlet port and into the passage.

15. The valve of claim 12 further comprising a passage in communication between the inlet port and said abrasive chamber, said passage communicating with the abrasive chamber through a junction with said junction having a cross-sectional area that is larger than a cross-sectional area of the passage so as to reduce velocity of particles as they enter the abrasive chamber.

16. The valve of claim 12 wherein said abrasive chamber features a diameter that is at least three times the diameter of the shaft so that particles entering the abrasive chamber are dispersed around said shaft.

17. The valve of claim 12 wherein said abrasive chamber has a diameter that tapers towards said exit orifice.

18. The valve of claim 12 further comprising a seat surrounding said exit orifice, said seat being tapered towards said exit orifice.

19. The valve of claim 12 wherein said shaft includes a circumferential groove which is engaged by said flexible barrier.

20. The valve of claim 12 wherein the abrasive inlet port of the abrasive chamber is formed in said shaft and further comprising an abrasive passage formed within said shaft that is in communication with said inlet port.

* * * * *